United States Patent
Chu et al.

(10) Patent No.: US 8,649,990 B2
(45) Date of Patent: Feb. 11, 2014

(54) METHOD FOR DETECTING VARIANCE IN SEMICONDUCTOR PROCESSES

(75) Inventors: Yij Chieh Chu, New Taipei (TW); Chun Chi Chen, Taipei (TW); Yun-Zong Tian, Taichung (TW)

(73) Assignee: Inotera Memories, Inc., Taoyuan County (TW)

( * ) Notice: Subject to any disclaimer, the term of this patent is extended or adjusted under 35 U.S.C. 154(b) by 290 days.

(21) Appl. No.: 13/170,229

(22) Filed: Jun. 28, 2011

(65) Prior Publication Data

US 2011/0257932 A1   Oct. 20, 2011

Related U.S. Application Data

(63) Continuation-in-part of application No. 12/202,631, filed on Sep. 2, 2008.

(30) Foreign Application Priority Data

Jul. 9, 2008   (TW) ................................ 97125844 A (51) Int. Cl.
*G06F 19/00* (2011.01)

(52) U.S. Cl.
USPC ............. 702/81; 702/179; 702/182; 700/108; 700/110

(58) Field of Classification Search
USPC ............ 702/81/179/182; 700/50/28/110/108; 706/904
See application file for complete search history.

(56) References Cited

U.S. PATENT DOCUMENTS

| | | | |
|---|---|---|---|
| 2004/0006447 A1* | 1/2004 | Gorin | 702/181 |
| 2006/0184264 A1* | 8/2006 | Willis et al. | 700/108 |

* cited by examiner

*Primary Examiner* — Janet Suglo
*Assistant Examiner* — Hien Vo
(74) *Attorney, Agent, or Firm* — Rosenberg, Klein & Lee (57) ABSTRACT

A method of detecting variance by regression model has the following steps. Step 1 is preparing the FDC data and WAT data for analysis. Step 2 is figuring out what latent variable effect of WAT data by Factor Analysis Step 3 is utilizing Principal Component Analysis to reduce the number of FDC variables to a few independent principal components. Step 4 is demonstrating how the tools and FDC data affect WAT data by Analysis of covariance model, and constructing interrelationship among FDC, WAT and tools. The interrelationship can point out which parameter effect WAT significantly. By the method, when WAT abnormal situation happened, it is easier for engineers to trace where the problem is.

20 Claims, 8 Drawing Sheets

METHOD FOR DETECTING VARIANCE IN SEMICONDUCTOR PROCESSES

CROSS REFERENCE TO RELATED APPLICATION

This application is a continuation-in-part of U.S. application Ser. No. 12/202,631, filed on Sep. 2, 2008 and entitled "METHOD FOR DETECTING VARIANCE IN SEMICONDUCTOR PROCESSES", now pending.

BACKGROUND OF THE INVENTION

1. Field of the Invention

The present invention is related to a method for variation detection; in particular, to a method for detecting variation in semiconductor processes, which performs correlation analyses on huge amount and complicated raw data outputted by semiconductor process tools to facilitate engineers to locate the sources generating such process variations.

2. Description of Related Art

Yield is a very important index in semiconductor manufactories; on one hand, yield indicates the success rate of producing wafer of a semiconductor manufacturer; on the other hand, yield also is crucially related with the potential profit of a semiconductor manufacturer. Therefore, how to enhance the yield has become one momentous issue of attention to which most semiconductor manufacturers closely and prudently pay.

Regarding this point, semiconductor manufacturers in recent years have devoted great efforts in researches and developments on Metrology integrated system technology and automatic real-time monitoring system, which monitors semiconductor process tools in order to increase wafer production yield and reduce occurrences of risks. The mostly employed system technology and automatic real-time monitoring system in current semiconductor manufacturers is the Fault Detection and Classification (FDC), used to analyze outputted data by the semiconductor tools to appreciate the causes of flaws occurred in wafers, further taking actions thereon beforehand so as to achieve the objectives about wafer yield enhancement, while avoiding wastes of massive and precious time and manpower resources on trouble-shooting.

Figure 1:
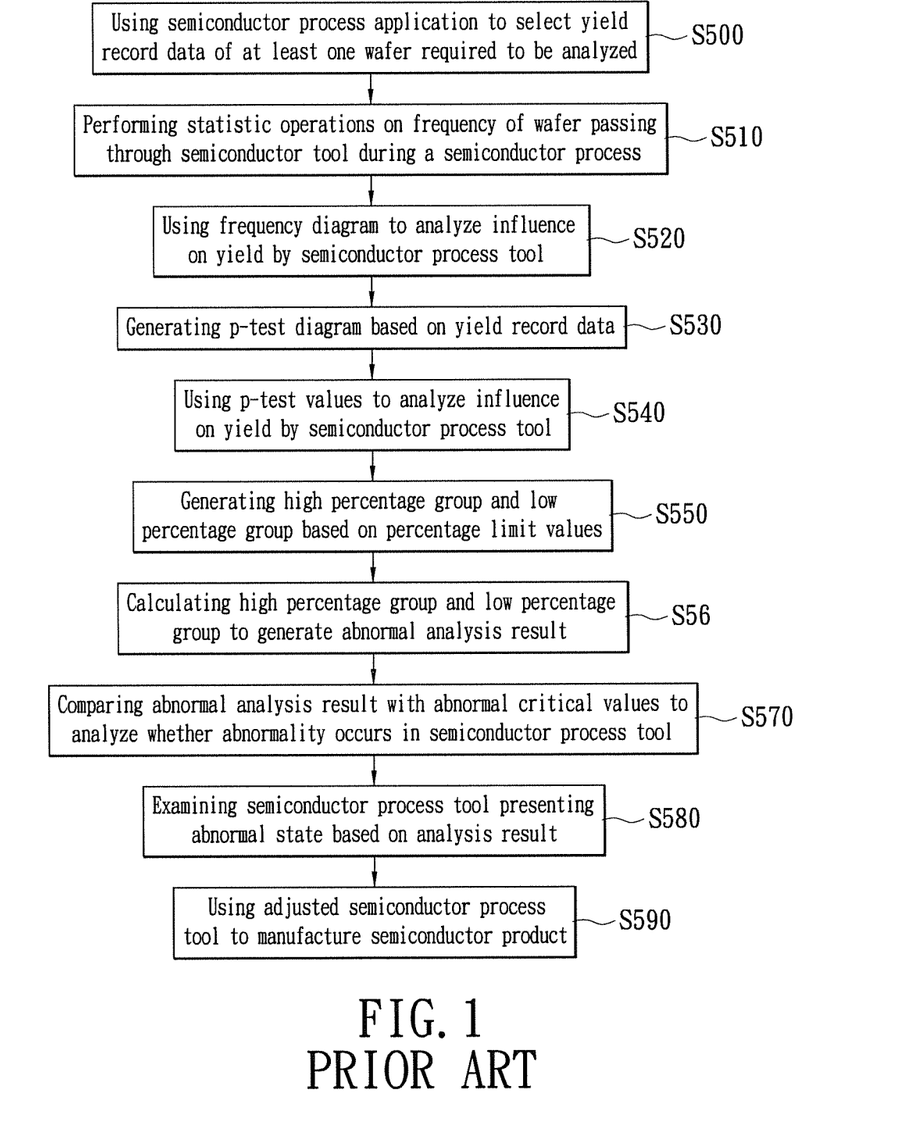
FIG. 1 shows a flowchart of a method for correlation analysis on semiconductor process tool yield in prior art.

For example, in Republic of China Patent Application No. 093118756, entitled "Method and System for Semiconductor Tools Yield Correlation Analysis and Method of Semiconductor Manufacturing implemented thereby and Storage Media for Storing Computer Application for Execution of the Method", discloses a method for semiconductor tools yield correlation analysis using a computer system to execute the following steps: initially, selecting the required analysis on yield record data of at least one wafer, and having the yield data inputted; next, performing statistics on the frequency of passing through a semiconductor tool of the wafer during a process, accordingly generating a frequency diagram; then, generating a p-test diagram based on the yield record data; and subsequently, generating a high percentage group and a low percentage group in accordance with a percentage limit value, calculating the high percentage group and the low percentage group to generate an abnormal analysis result; and further, based on an abnormal critical value, comparing the calculated abnormal analysis result with the abnormal critical value to analyze whether said semiconductor tool is normal; finally, detecting said semiconductor tool according to the calculated analysis results. The method is depicted in FIG. 1. However, in terms of the correlation of the machine, the aforementioned patent can only be applied in detection single semiconductor or single process step, and cannot be applied in multiple process steps to analyze the influence on yield of a plurality of semiconductor process tools. Therefore, in, terms of most monitoring methods or equipments, said Patent is unable to effectively locate the semiconductor tool among many which affects the yield the most in multiple process steps.

Figure 2:
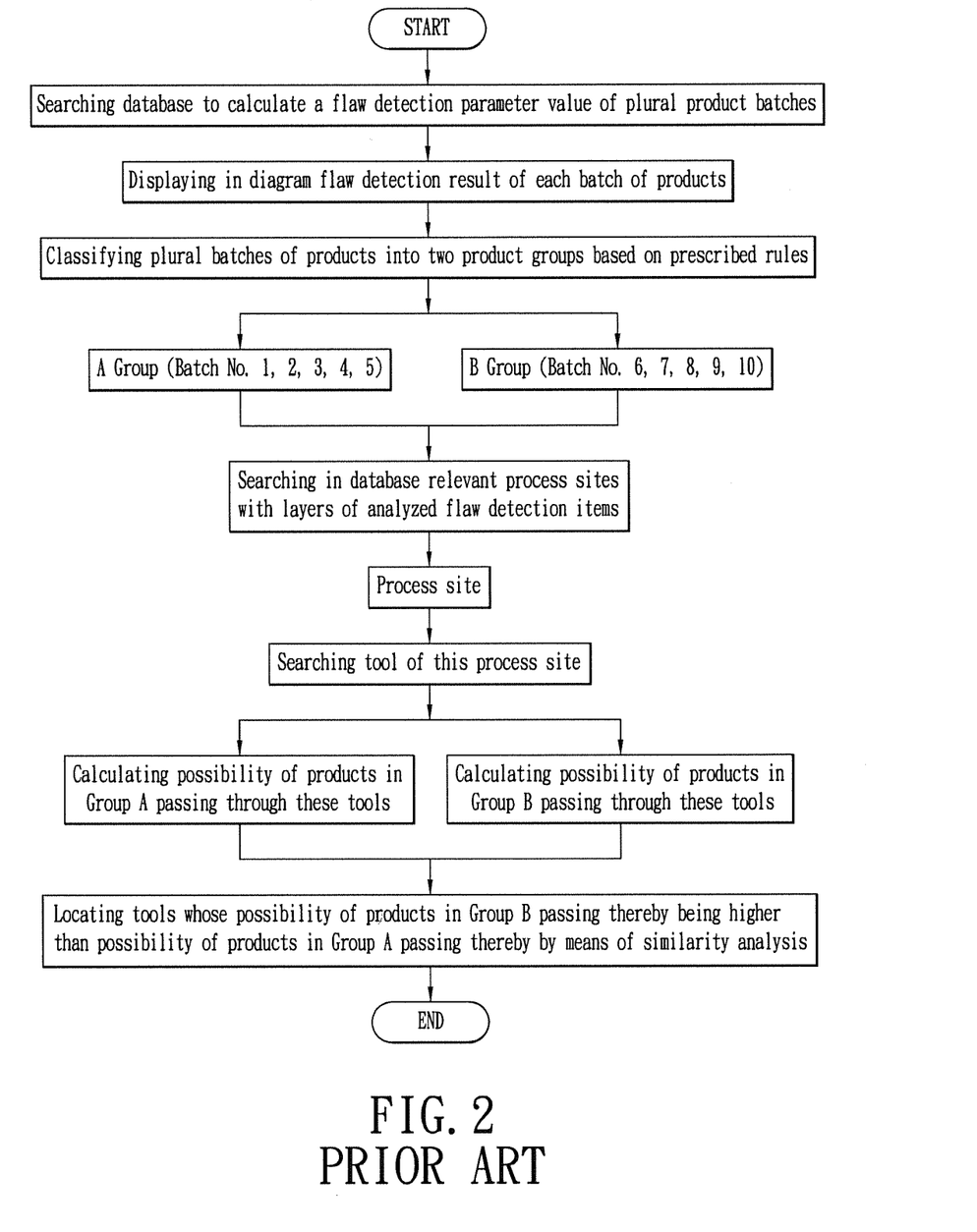
FIG. 2 shows a flowchart of a method for flaw detection parameter analysis in prior art.

Furthermore, in Republic of China Patent Application No. 091138167, titled "Method for Flaw Detection Parameter Analysis", said Patent discloses a method for flaw detection parameter analysis (refer to FIG. 2), which is used to analyze plural batches of products, each having a batch number, each product being fabricated by means of a plurality of tools, and one or more wafers in each batch of products having been examined through at least one flaw detection item to generate a flaw detection parameter value; engineers may accordingly determine which process has problems and leads to the reduction in wafer yield, based on the information of the flaw detection parameter value; however, the method used in the aforementioned patent application is excessively complicated and engineers need to set various rules to perform flaw detection analysis; hence much time is spent in rule setting, causing unnecessary wastes of precious resources, leading to insufficiency in practical usage.

Accordingly, having considered the above-mentioned amendable detects, the present inventors proposed the present invention for providing reasonable and effective improvement on the disadvantages described supra.

SUMMARY OF THE INVENTION

The essential objective of the present invention is to provide a method for detecting variation in semiconductor processes, by using correlation analysis to locate the causes of variation which influence semiconductor process tools, in order to achieve the objectives of wafer yield enhancement, production cost reduction and efficiency monitoring.

To achieve the aforementioned objectives, the present invention provides a method for detecting variation in semiconductor processes, comprising the following steps: collecting a plurality of tool process data, a plurality of first raw data and a plurality of second raw data; pre-processing said first raw data and said second raw data; using a first statistic analysis method to process said first raw data to reduce said first raw data and calculate a plurality of correlation data; using a second statistic analysis method to process said second raw data to locate a plurality of global index data representing said second raw data; using a third statistic analysis method to process the plurality of tool process data, the plurality of global index data and the plurality of correlation data to build a plurality of interrelationship indices; finally, locating the essential reason causing such a semiconductor process variation based on the plurality of interrelationship indices.

The present invention provides the following beneficial effects:

1. by using the method according to the present invention it is possible to locate the reason affecting the wafer production yield;

2. by using the method according to the present invention it is possible to simplify the collected raw data, reduce the complexity of analysis on raw data, facilitating engineers to locate the cause for such a semiconductor process variation, thus avoiding massive waste of time;

3. without requiring huge amount of raw data, advantageous lowering system cost down and complexity;

4. enhancing control over semiconductor process efficiency, saving much analysis time and manpower.

To further understand the characteristics and technical contents of the present invention, references are made to the detailed descriptions and appended drawings of the present invention; however, the appended drawings are simply for references and illustrations, but not for restricting the present invention thereto.

DETAILED DESCRIPTION OF THE PREFERRED EMBODIMENTS

Figure 3:
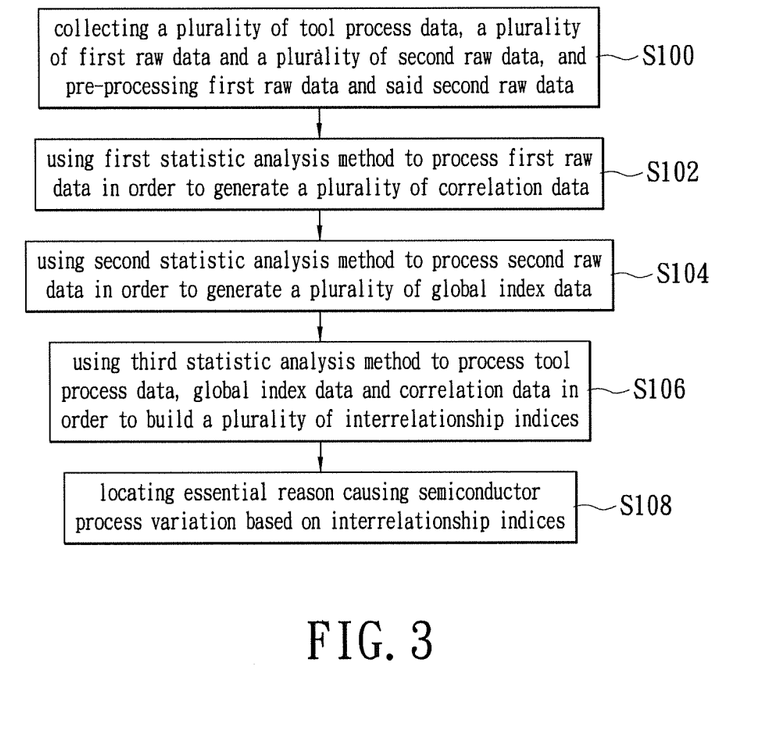
FIG. 3 shows a step-wise flowchart of a method for detecting variation in semiconductor processes according to the present invention.

Refer now to FIG. 3, wherein the present invention proposes a method for detecting variation in semiconductor processes, which method for detecting variation in semiconductor processes comprises the following steps:

S100: collecting a plurality of tool process data, a plurality of first raw data and a plurality of second raw data, and pre-processing said first raw data and said second raw data;

S102: using a first statistic analysis method to process said first raw data in order to generate a plurality of correlation data;

S104: using a second statistic analysis method to process said second raw data in order to generate a plurality of global index data;

S106: using a third statistic analysis method to process the plurality of tool process data, the plurality of global index data and the plurality of correlation data in order to build a plurality of interrelationship indices;

S108: locating the essential reason causing such a semiconductor process variation based on the plurality of interrelationship indices.

Figure 4:
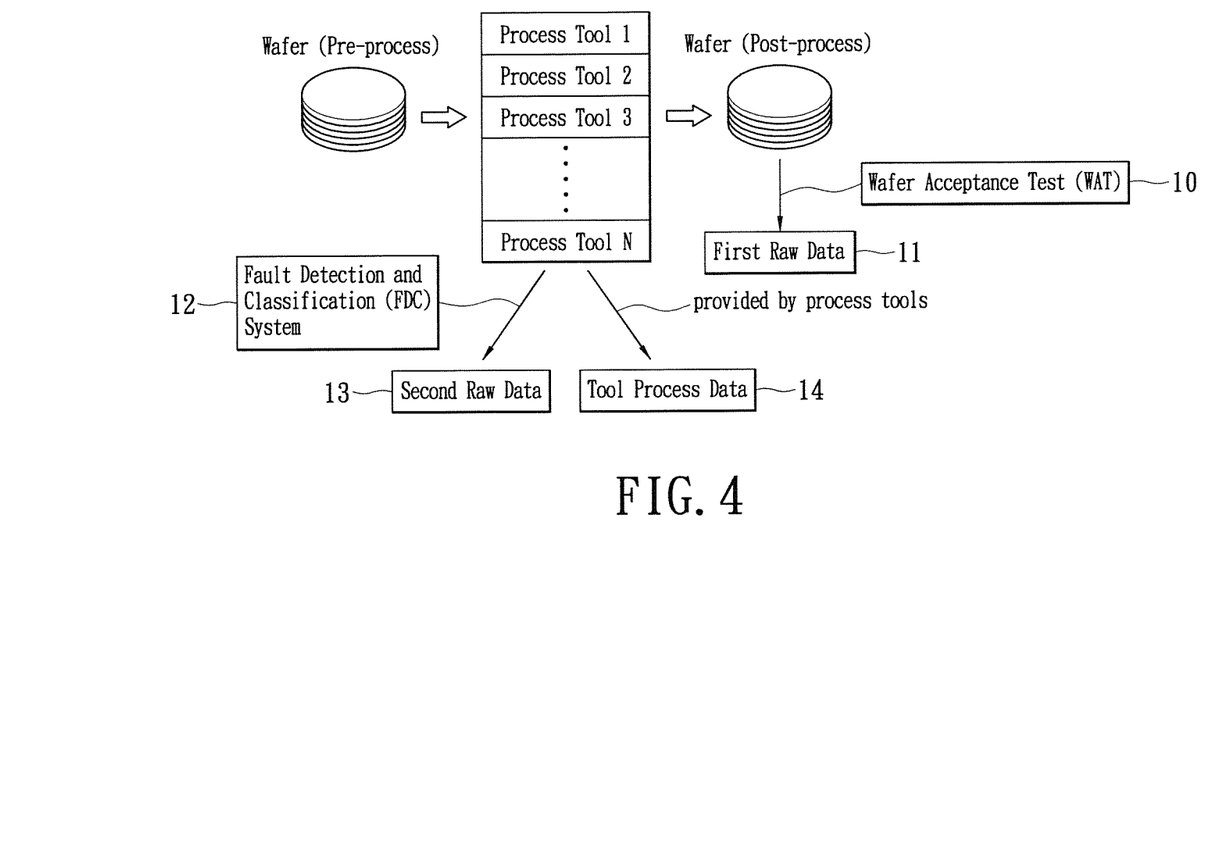
FIG. 4 shows a flowchart of a method for detecting variation in semiconductor processes according to the present invention.
Figure 10:
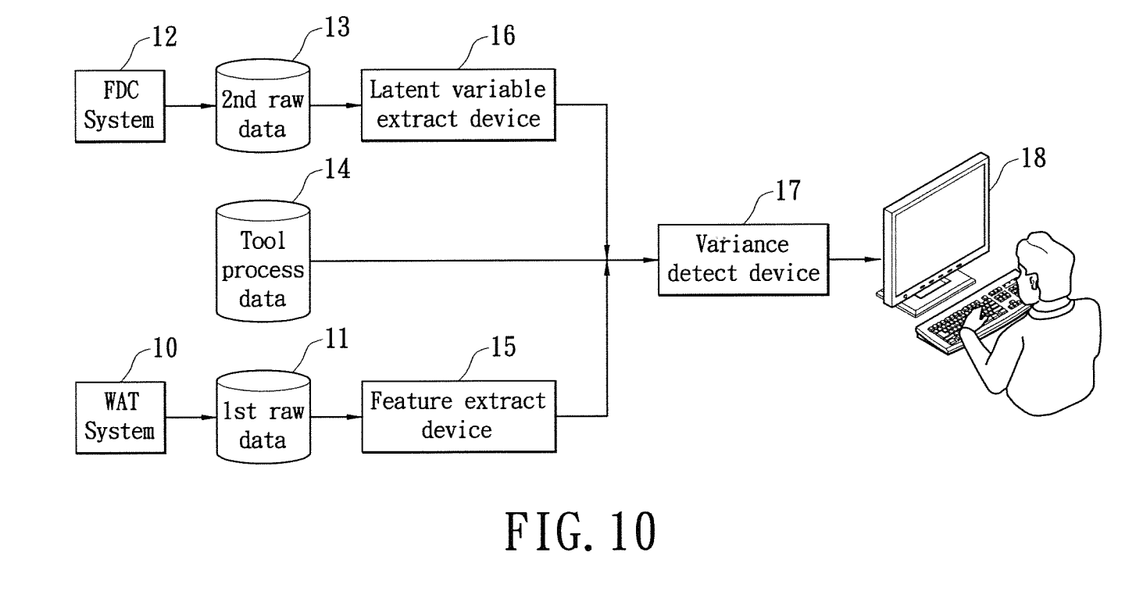
FIG. 10 shows a system of detecting variation in semiconductor processes according to the present invention.

To help those skilled ones in the art better understand and implement the present invention, herein the details of the method according to the present invention will be explained. Referring now to FIGS. 4 and 10, in conjunction with FIG. 3, wherein a Wafer Acceptance Test (WAT) procedure is performed on the wafer, which executes electrical tests on the structure configured on the wafer, and provides the tested results to engineers to allow them to acquire a plurality of first raw data, and the acquired plurality of first raw data indicates the electrical test data of the tested wafer. A WAT system 10 may include numerous testing items, which specifies a number of testing sites of wafers. The first raw data of tested wafers may be stored in an event database 11 Meanwhile, engineers collects a plurality of tool process data provided by a plurality of process tools, and such a plurality of process tools indicates the wafer process data currently used by those process tools, which is stored in an auxiliary database 14; additionally, a Fault Detection and Classification (FDC) system 12 commonly used in semiconductor industry is used to collect the plurality of second raw data in a parameter database 13, and the plurality of second raw data indicates the variation detection values detected and measured on each wafer by the Fault Detection and Classification (FDC) system in each real-time process state. By means of the aforementioned WAT 10, process tools (such as deposition tools, etch tools or lithograph tools) and FDC system (12), it can allow engineers to collect these tool process data, first raw data and second raw data.

Next, the method performs pre-processes on said plurality of first raw data and said plurality of second raw data by a processing tool, such as a computer, or the operation management unit 18 for filtering out meaningless variation values existing among these first raw data and second raw data to avoid influencing the precision of the present invention.

Figure 5:
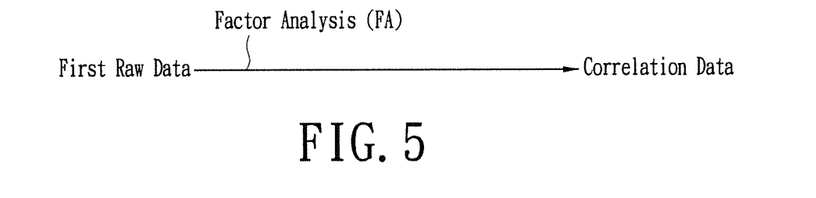
FIG. 5 shows a flowchart of the first statistic analysis method according to the present invention.
Figure 6:
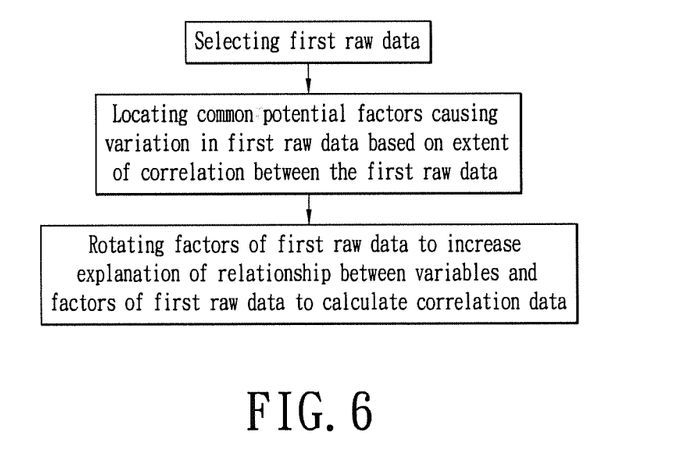
FIG. 6 shows a step-wise flowchart of the first statistic analysis method according to the present invention.

Further, by using a first statistic analysis method on the first raw data via a feature extract device 15, a plurality of correlation data is generated (as shown in FIG. 5). The correlation feature extract device 15 may calculate the feature quantity using any mathematical transformation that enhances a quality or aspect of the sample measurement for interpretation. In the exemplary embodiment, the first statistic analysis method is Factor Analysis (FA), and the process steps thereof comprise (referring to FIG. 6):

(A) initially, selecting the plurality of first raw data;

(B) based on the extent of correlation between the plurality of first raw data, locating the common potential factors causing the variation in the plurality of first raw data;

(C) rotating the factors of the plurality of first raw data.

The step (C) means to increase the relationship between variables and factors of said plurality of first raw data. Additionally, it is to be mentioned that, in the steps of the first statistic analysis method, the factors of the plurality of first raw data must define the lowest bound for the variation amount so as to determine the number of factor selection.

Figure 7:
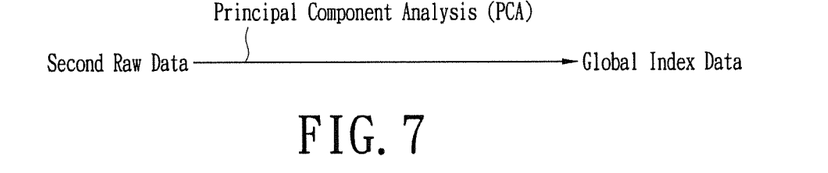
FIG. 7 shows a flowchart of the second statistic analysis method according to the present invention.
Figure 8:
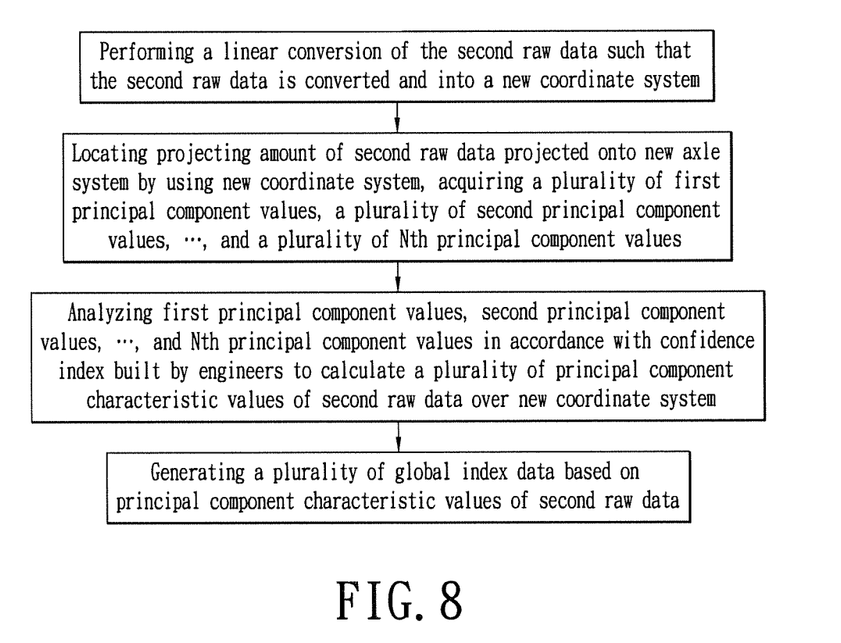
FIG. 8 shows a step-wise flowchart of the second statistic analysis method according to the present invention.

Since, after the pre-process, the plurality of first raw data still has too many dimensions, which is too complicated to allow engineers to employ, it is thus necessary for simplify the second raw data by means of a second statistic analysis method for locating a plurality of global index data (as shown in FIG. 7) via a latent variable extract device 16, and for enabling usage by engineers. In the exemplary embodiment, the second statistic analysis method is the Principal Component Analysis (PCA), and the process steps performed by the second statistic analysis method on the plurality of second raw data comprise (referring to FIG. 8):

(A) performing a linear conversion of the plurality of second raw data based on the plurality of second raw data; that is, the plurality of second raw data existing in the original coordinate system are converted into a plurality of second raw data existing in a new coordinate system, in which the new coordinate system has a plurality of new axles respectively referred as a first new axle, a second new axle, . . . , and a Nth new axle, and the first new axle is referred as the first principal component, the second new axle as the second principal component, . . . , the Nth new axle as the Nth principal component; besides, each of the new axle is a linear combination of each original axle existing in the original coordinate system;

(B) locating the projecting amount of the second raw data projected onto the plurality of new axles by using the new coordinate system, acquiring a plurality of first principal component values over the first new axle (the first principal component), a plurality of second principal component values over the second new axle (the second principal component), . . . , and a plurality of Nth principal component values over the Nth new axle (the Nth principal component);

(C) analyzing the plurality of first principal component values, the plurality of second principal component values, . . . , and the plurality of Nth principal component values in accordance with confidence index built by engineers to calculate a plurality of principal component characteristic values, which the plurality of principal component characteristic values represents the second raw data, wherein the objective of the confidence index is to simplify the second raw data through retaining low order principal component values while ignoring high order principal component values;

(D) generating the plurality of global index data based on the principal component characteristic values of the plurality of second raw data.

Figure 9A:
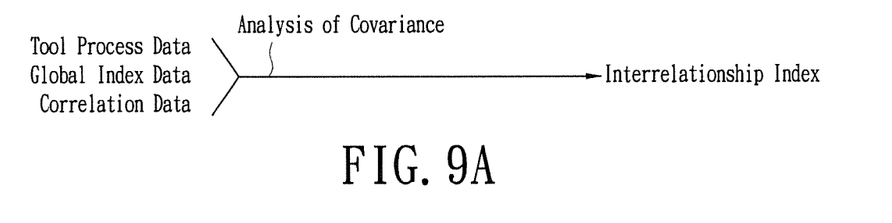
FIG. 9A shows a flowchart of the third statistic analysis method according to the present invention.
Figure 9B:
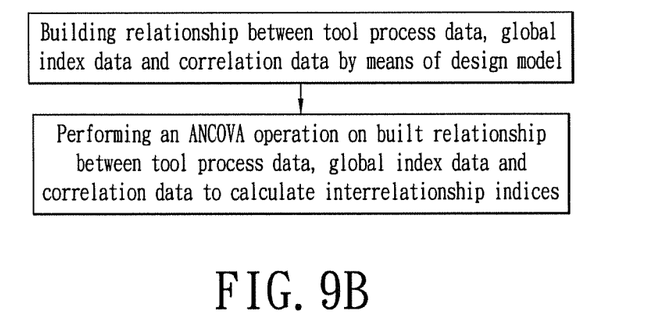
FIG. 9B shows a step-wise flowchart of the third statistic analysis method according to the present invention.

After acquisition of the plurality of correlation data and global index data, a third statistic analysis method is employed to perform operations on the tool process data, the global index data and the correlation data to generate a plurality of interrelationship indices (as shown in FIG. 9) via a variance detect device 17. The interrelationship indices represents the results of influence on the correlation data by the tool process data and the global index data, wherein the third statistic analysis method is an Analysis of Covariance (ANCOVA), whose process steps comprise (as shown in FIG. 9B):

(A) building the relationship between the tool process data, global index data and correlation data by means of the design model;

(B) performing an ANCOVA operation on the built relationship between the tool process data, global index data and correlation data to calculate the interrelationship indices.

Figure 9C:
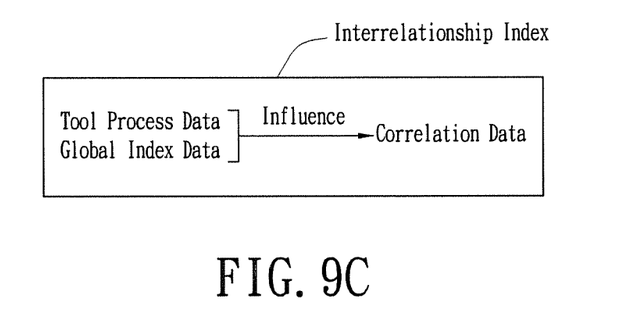
FIG. 9C shows a relationship diagram of the interrelationship indices according to the present invention.

As shown in FIG. 9C, the interrelationship indices, which is shown on an operation management unit 18, indicate results of influence on the correlation data by the tool process data and the global index data, and since the correlation data represents the first raw data and the global index data represents the second raw data, the tool process data and the second raw data mutually influence the first raw data in accordance with the meaning of the interrelationship indices; as a result, engineers may use these interrelationship indices to pre-determine whether the occurrence of variance in the first raw data is caused by the tool process data or else the second raw data, with a view to locate the problem and provide relevant measurements to avoid reduction in wafer yield. Please note that the feature extract device 15, latent variable extract device 16 and variance detect device 17 may be installed on the operation management unit 18.

As such, the present invention provides the following advantages:

1. fundamental causes of variation can be located by practicing the method according to the present invention;

2. variations in a semiconductor process can be controlled in advance by monitoring the fundamental causes of variation, so as to effectively monitor the target of the process in real-time to avoid consistent damage to wafers, resulting reduction in wafer yield;

3. data is collected by means of the method according to the present invention, allowing the data to retain original important real-time information contents without causing losses of fidelity in data due to various analyses and operations;

4. time can be effectively saved, and human power devoted on searches for causes of variation can be reduced, thus the method according to the present invention helps improvement on yield for wafer manufacturing control.

The aforementioned descriptions simply illustrate the preferred embodiments of the present invention, not for intend to limit the claimed scope of the present invention thereto. It should be stated that all effectively equivalent changes or modifications made based on the specifications and drawings of the present invention are to be reasonably encompassed by the claims of the present invention for legal protection.

What is claimed is:

1. A method for detecting variation in semiconductor processes, comprising the following steps:
   collecting, respectively:
   a plurality of tool process data from a plurality of process tools,
   a plurality of first raw data associated with a wafer acceptance test (WAT) system, and
   a plurality of second raw data associated with a fault detection and classification (FDC) system;
   pre-processing said first raw data and said second raw data by an operation management unit;
   via a feature extract device, generating a plurality of correlation data by processing the first raw data using a first statistic analysis method, the first statistic analysis method being factor analysis (FA),
   wherein the steps of the FA for processing the plurality of first raw data comprise:
   selecting the plurality of first raw data,
   locating common potential factors causing a variation in the plurality of first raw data based on the plurality of first raw data,
   rotating the common potential factors of the plurality of first raw data in order to calculate the plurality of correlation data, wherein the common potential factors of the plurality of first raw data define a lowest bound of the variation in the plurality of first raw data so as to determine a number of common potential factor selection;
   via a latent variable extract device, identifying a plurality of global index data by processing the second raw data using a second statistic analysis method;
   via a variance detect device, building a plurality of interrelationship indices by processing the tool process data, global index data, and the correlation data using a third statistic analysis method; and
   identifying an essential reason causing such a semiconductor process variation based on the plurality of interrelationship indices by the operation management unit.

2. The method for detecting variation in semiconductor processes according to claim 1, wherein the tool process data represents the wafer process data employed by deposition tools, etch tools or lithograph tools.

3. The method for detecting variation in semiconductor processes according to claim 1, wherein the plurality of first raw data represents the electrical test data of a plurality of wafers tested by the WAT system.

4. The method for detecting variation in semiconductor processes according to claim 1, wherein the plurality of second raw data is provided by the FDC system, and the plurality of second raw data indicates the variation detection values detected and measured on each wafer by the FDC system in each real-time process state.

5. The method for detecting variation in semiconductor processes according to claim 1, wherein meaningless detection values are filtered out from the plurality of first raw data and the plurality of second raw data in the pre-processing step.

6. The method for detecting variation in semiconductor processes according to claim 1, wherein a correlation matrix is used to estimate a similarity among the plurality of first raw data.

7. The method for detecting variation in semiconductor processes according to claim 1, wherein determining the number of factors of the plurality of first raw data is based on experience of engineers to determine the number of factors.

8. The method for detecting variation in semiconductor processes according to claim 1, wherein the second statistic analysis method is a Principal Component Analysis (PCA).

9. The method for detecting variation in semiconductor processes according to claim 8, wherein the steps of PCA for processing the second raw data comprise: classifying the plurality of second raw data, performing a linear conversion of the plurality of second raw data, which linear conversion converts the plurality of second raw data existing in an original coordinate system into a plurality of second raw data existing in a new coordinate system, in which the new coordinate system has a plurality of new axles respectively referred as a first new axle, a second new axle, ..., and a Nth new axle; locating a projecting amount of the second raw data projected onto the plurality of new axles, acquiring a plurality of first principal component values over the first new axle, a plurality of second principal component values over the second new axle, ..., and a plurality of Nth principal component values over the Nth new axle; processing the plurality of first principal component values, the plurality of second principal component values, ..., and the plurality of Nth principal component values in accordance with a confidence index to calculate a plurality of health indices over the plurality of principal component characteristic values; finally generating a plurality of global index data based on the plurality of principal component characteristic values.

10. The method for detecting variation in semiconductor processes according to claim 9, wherein the confidence index is built based on experience by engineers.

11. The method for detecting variation in semiconductor processes according to claim 9, wherein the confidence index simplifies the plurality of second raw data through retaining low order principal component values while ignoring high order principal component values.

12. The method for detecting variation in semiconductor processes according to claim 1, wherein the third statistic analysis method is an Analysis of Covariance (ANCOVA).

13. The method for detecting variation in semiconductor processes according to claim 12, wherein processing the tool process data, the global index data and the correlation data by mean of ANCOVA operation comprises: building a relationship between the tool process data, global index data and correlation data by means of a design model; performing ANCOVA operation on the built relationship between the tool process data, global index data and correlation data to calculate the interrelationship indices.

14. The method for detecting variation in semiconductor processes according to claim 1, wherein the interrelationship indices represent the results of influence on the correlation data by the tool process data and the global index data.

15. A method for detecting variation in semiconductor processes, comprising the following steps:
   collecting, respectively:
      a plurality of tool process data from a plurality of process tools,
      a plurality of first raw data associated with a wafer acceptance test (WAT) system, and
      a plurality of second raw data associated with a fault detection and classification (FDC) system;
   pre-processing said first raw data and said second raw data by an operation management unit;
   via a feature extract device, generating a plurality of correlation data by processing the first raw data using a first statistic analysis method;
   via a latent variable extract device, identifying a plurality of global index data by processing the second raw data using a second statistic analysis method, the second statistic analysis method being the principle component analysis (PCA), wherein the steps of PCA for processing the second raw data comprise:
      classifying the plurality of second raw data, performing a linear conversion of the plurality of second raw data, which linear conversion converts the plurality of second raw data existing in an original coordinate system into a plurality of second raw data existing in a new coordinate system, in which the new coordinate system has a plurality of new axles respectively referred as a first new axle, a second new axle, ..., and a Nth new axle,
      locating a projecting amount of the second raw data projected onto the plurality of new axles, acquiring a plurality of first principal component values over the first new axle, a plurality of second principal component values over the second new axle, ..., and a plurality of Nth principal component values over the Nth new axle,
      processing the plurality of first principal component values, the plurality of second principal component values, ..., and the plurality of Nth principal component values in accordance with a confidence index to calculate a plurality of health indices over the plurality of principal component characteristic values, and
      generating a plurality of global index data based on the plurality of principal component characteristic values;
   via a variance detect device, building a plurality of interrelationship indices by processing the tool process data, global index data, and the correlation data using a third statistic analysis method; and
   identifying an essential reason causing such a semiconductor process variation based on the plurality of interrelationship indices by the operation management unit.

16. The method for detecting variation in semiconductor processes according to claim 15, wherein the confidence index is built based on experience by engineers.

17. The method for detecting variation in semiconductor processes according to claim 15, wherein the confidence index simplifies the plurality of second raw data through retaining low order principal component values while ignoring high order principal component values.

18. The method for detecting variation in semiconductor processes according to claim 15, wherein the third statistic analysis method is an Analysis of Covariance (ANCOVA).

19. The method for detecting variation in semiconductor processes according to claim 18, wherein processing the tool process data, the global index data and the correlation data by mean of ANCOVA operation comprises: building a relationship between the tool process data, global index data and correlation data by means of a design model; performing ANCOVA operation on the built relationship between the tool process data, global index data and correlation data to calculate the interrelationship indices.

20. The method for detecting variation in semiconductor processes according to claim 15, wherein the interrelationship indices represent results of influence on the correlation data by the tool process data and the global index data.

* * * * *